L. E. ARNOLD.
MACHINE FOR TREATING PINEAPPLES OR THE LIKE.
APPLICATION FILED MAY 13, 1910.

1,006,621.

Patented Oct. 24, 1911.
2 SHEETS—SHEET 1.

Witnesses.

Inventor
L. E. Arnold,

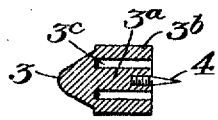
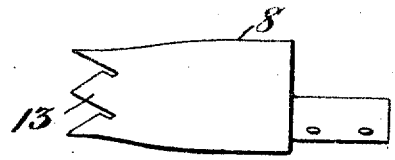
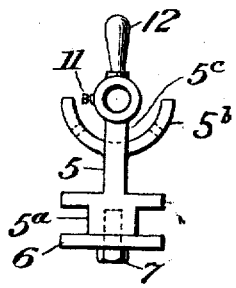
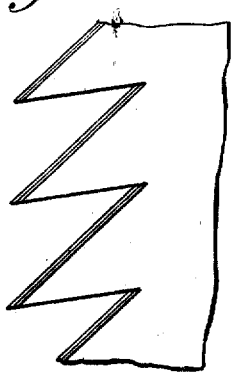
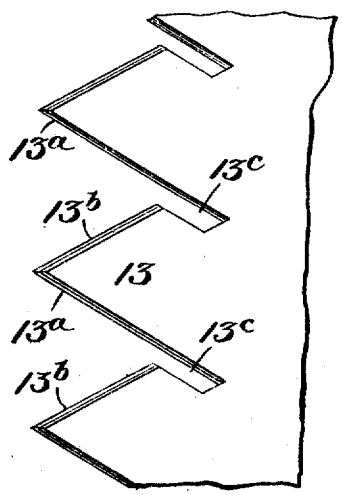

UNITED STATES PATENT OFFICE.

LEWIS E. ARNOLD, OF HONOLULU, TERRITORY OF HAWAII.

MACHINE FOR TREATING PINEAPPLES OR THE LIKE.

1,006,621.   Specification of Letters Patent.   Patented Oct. 24, 1911.

Application filed May 13, 1910. Serial No. 561,086.

*To all whom it may concern:*

Be it known that I, LEWIS E. ARNOLD, a citizen of the United States, residing at Honolulu, in the county of Honolulu, Territory of Hawaii, have invented certain new and useful Improvements in Machines for Treating Pineapples or the Like; and I do hereby declare the following to be a full, clear, and exact description of the invention, such as will enable others skilled in the art to which it appertains to make and use the same.

This invention relates to machines for treating pineapples or the like to prepare same for canning.

The object of my invention is to produce a simple and efficient machine by which the fruit may be cored, peeled and sized in one operation.

A further object is to do away with all revolving parts, such as are used in machines heretofore employed for this purpose.

This invention contemplates a frame, a head against which one end of the fruit to be treated is centered, a stripper, and a head provided with a coring tube and with a sizing tube and with means for parting the rind, all as hereinafter described and claimed. The novel construction of the sizing knife as contemplated by this invention makes its unnecessary to revolve either the sizing tube or the fruit.

This specification is a specific description of one form of the invention while the claims are definitions of the actual scope thereof.

One form of the invention is illustrated in the accompanying drawings, forming a part of this specification, in which—

Figure 1:
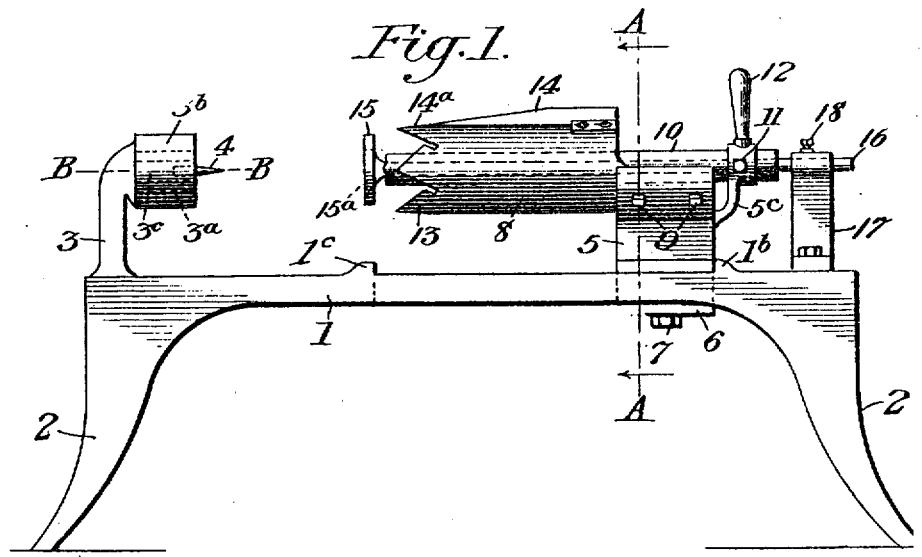
Figure 2:
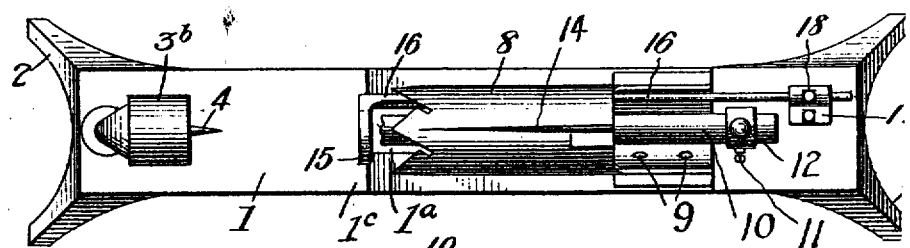
Figure 3:
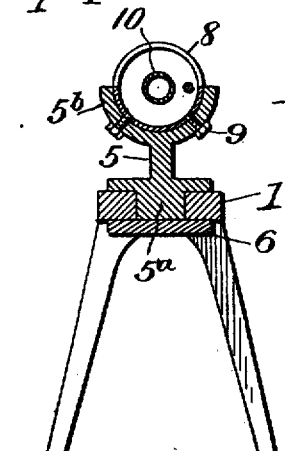

Figure 1 represents a side elevation of a machine embodying my improvements. Fig. 2 shows a top plan view of the same. Fig. 3 represents a sectional elevation on the line A—A of Fig. 1. Fig. 4 shows a sectional view on the line B—B of Fig. 1. Fig. 5 shows a rear end view of the sliding head. Fig. 6 is an enlarged view of a development of part of the cutting end of the sizing tube. Fig. 7 is a modification of Fig. 6. Fig. 8 is a plan view of a modification of the sizing tube.

1 represents the bed or frame of the machine, which is supported by suitable legs 2. A stationary head 3, supported at one end of the frame 1, is provided with a boss $3^a$ and with an annular ring $3^b$, a recess $3^c$ being formed between said boss and ring. A pin 4 or the like is secured in the center of the boss $3^a$, on which one end of the fruit to be treated is centered.

The movable head 5 is provided with a tongue $5^a$ which fits a longitudinal slot $1^a$ in the frame 1, and a plate or washer 6 is bolted to the head 5 under the frame 1 by the bolt 7, such that the head 5 may slide upon the frame 1 between the stops $1^b$ and $1^c$. The curved upper portion $5^b$ of the head 5 receives the rear end of the sizing tube 8 and the bolts 9 fasten same together. The head 5 is also provided with an arm $5^c$, in which the coring tube 10 is adjustably secured by a set screw 11. A handle 12 may be provided for operating the sliding head 5.

Knives 13, preferably of the V shape shown, are formed on the cutting end of the sizing tube 8, four being illustrated. It will be noted that one cutting edge $13^a$ of each knife 13 is made longer than the cutting edge $13^b$ on the opposite side of the V, and that a portion of the edge $13^a$ extends rearward as well as laterally with respect to the adjacent cutting edge $13^b$, with a slot $13^c$ between them, clearly shown in Fig. 6, and such that a portion of the edge $13^a$ crosses the path of a portion of the edge $13^b$ when the sizing tube 8 is moved forward or toward the head 3, this being done to insure that the fruit may be completely sized, and not leave a portion of the fruit or fibers of same uncut, as would otherwise occur at the bottom of the crotch formed between adjacent V shaped knives if both cutting edges were made alike and met in the crotch. Both cutting edges are inclined to the longitudinal axis of the sizing tube to give a shearing cut.

In the modification shown in Fig. 7, each knife is provided with only one cutting edge, inclined to the longitudinal axis of the sizing tube, and a portion of each knife extends rearward, laterally and back of the cutting edge of the adjacent knife in the crotch formed between the knives, for the same purpose as previously described. In this case, however, the knives have a tendency to revolve the fruit. A fin-shaped knife or wedge 14 is secured to the outside of the sizing tube 8 arranged longitudinally therewith, and with its point $14^a$ preferably just in the rear of one of the knives 13. A stripper plate 15, provided with a clearance hole $15^a$ through which the coring tube 10 may pass freely, is attached to the end of a bar 16. The diameter of the stripper plate 15 is such that the sizing tube 8 may pass over and clear same. The bar 16 is adjustably supported, by the set screw 18 in the bracket 17 secured to the rear end of the frame 1. The ring 3ᵇ of the stationary head 3, against which one end of the fruit abuts, is made small enough to clear the knives 13. The recess 3ᶜ is provided to admit the cutting end of the coring tube 10. If desired the cutting end of the coring tube may be provided with knives of the same style as described for the sizing tube 8. The forward or cutting end of the coring tube 10 is preferably in advance of the knives 13 of the sizing tube 8, for the purpose of centering the end of the fruit by the core and not by the outside of the fruit.

In the modification shown in Fig. 8, the sizing tube 8 is expanded just back of the knives 13, the object being to force asunder the outer portion of the fruit cut by the knives and cause same to fall away from the sizing tube 8. If desired, a knife 14 may be added.

It is obvious that various modifications may be devised without departing from the invention, for example, the head 5 with coring tube 10 and sizing tube 8 could be made the stationary member, and the head 3 made the movable member, the stripper in this case being supported by the movable member. Of course more than one knife 14 may be used.

In operation, the position of the stripper plate 15 is adjusted to admit a fruit between the point of the pin 4 and said stripper, the ends of the fruit preferably having been cut off. The fruit is then centered by hand and forced on the pin 4. The movable head 5 being in its rear position is now slid forward, bringing the cutting end of the coring tube 10 through the hole 15ᵃ in the stripper plate 15 and up to the end of the fruit. This end of the fruit is now moved by hand to bring the core concentric with the coring tube 10. The head 5 is then moved forward to the stop 1ᶜ, and in so doing the coring tube has been passed through the fruit and into the recess 3ᶜ, the boss 3ᵃ entering the coring tube 10. At the same time the knives 13 have completely passed through the fruit and are now outside of the ring 3ᵇ which has entered the sizing tube 8; the knives 13 have cut the fruit with a shearing cut to the desired size, and the fin knife 14 has cut the rind longitudinally and permitted the portion of the fruit outside of the sizing tube 8 to fall away from the latter. The head 5 is now returned to its former position against the stop 1ᵇ, withdrawing the coring tube 10 (with the core inside) from the fruit, and at the same time the sizing tube 8 has been withdrawn from the fruit by the interference of the stripper 15. The fruit has thus been cored, peeled and sized, and the operation is repeated with the next fruit. The cores are forced out through the rear end of the coring tube 10 by the succeeding cores.

I claim:

1. In a machine such as described, a fixed centering abutment, a non-rotative sizing tube slidable toward and away from the same, and a coring tube fixed in said sizing tube but adjustable longitudinally thereof.

2. In a machine such as described, a fixed centering abutment, a slidable head, a sizing tube on said head, and a coring tube extending within said sizing tube and mounted on said head, free of said sizing tube.

3. In a pineapple machine, a fixed abutment, a sizing tube and coring tube movable as a unit toward and away from said abutment, and a fixed stripping element.

4. In a pineapple machine, a centering abutment, a sizing head movable toward and away from the same and having a fixed interior coring tube, and a stripping element which retains the cored and sized fruit against said abutment when said head is withdrawn.

5. In a pineapple machine, a centering abutment, a sizing head slidable toward and away from the same, and a fixed stripping element which retains the sized fruit against said abutment when said head is withdrawn.

6. In a pineapple machine, fixed abutments between which the fruit is centered, and means for sizing the fruit while held between said abutments.

7. In a pineapple machine, fixed abutments between which the fruit is centered, and a sliding head for sizing the fruit while held between said abutments.

8. In a pineapple machine, fixed abutments between which the fruit is centered, and means for sizing and coring the fruit while held between said abutments.

9. In a pineapple machine, a fixed centering abutment, a fixed stripping element between which and said abutment the fruit is centered, and a sizing head and coring tube movable as a unit over and into the fruit so positioned, said stripping element retaining the sized and cored fruit against said abutment when said head is withdrawn.

10. In a pineapple machine, a fixed abutment, a fixed stripping element having a perforated end between which and said abutment the fruit is centered, and a sliding head carrying a sizing tube movable over said perforated end and a coring tube movable through the same.

11. In a pineapple machine, a frame, a stationary head thereon, a movable head having a sizing tube and a coring tube, and a stripper between said heads.

12. In a pineapple machine, a frame, a stationary head thereon, a head movable toward and away from said stationary head and having a sizing tube and a coring tube, and a stripper mounted at one end on the frame and extending through the sizing tube, the opposite end of said stripper supporting the fruit against said stationary head and being perforated for the passage of the coring tube.

13. In a pineapple machine, a sizing tube having an exterior knife or wedge to slit the rind of the fruit as it passes over the tube.

14. In a pineapple machine, a sizing tube having a fixed longitudinally extending knife or wedge applied to the exterior surface thereof to slit the fruit rind longitudinally during the sizing operation.

15. In a machine such as described, a sizing tube, a coring tube, and a stripper supported by means passing through said sizing tube and provided with an opening to clear the coring tube.

16. In a pineapple machine, a cutting tube having V-shaped knives at the cutting edge, one edge of each knife being longer than the adjacent edge of the next knife.

17. In a pineapple machine, a cutting tube having V-shaped knives at the cutting edge, one edge of each knife extending rearward and laterally with respect to the adjacent cutting edge of the next knife.

18. In a pineapple machine, a cutting tube having projecting knives at the cutting edge, with opposite edges disposed at an angle to each other, one edge of each knife extending rearward and laterally with respect to the adjacent edge of the adjacent knife and being separated therefrom by a slot, as described.

In testimony whereof I affix my signature, in presence of two witnesses.

LEWIS E. ARNOLD.

Witnesses:
ROBT J. PRATT,
H. G. GINACA.